United States Patent [19]

Lechter et al.

[11] 4,235,524
[45] Nov. 25, 1980

[54] REFLECTING APPARATUS

[75] Inventors: George Lechter, Brookline; David S. Eckel, Revere, both of Mass.

[73] Assignee: Rorrim Incorporated, Cambridge, Mass.

[21] Appl. No.: 53,314

[22] Filed: Jun. 29, 1979

[51] Int. Cl.³ ............................ G02B 5/08; G02B 5/10
[52] U.S. Cl. .................................... 350/299; 350/306; 350/310
[58] Field of Search ............... 350/288, 299, 305, 306, 350/310

[56] References Cited

U.S. PATENT DOCUMENTS

| | | | |
|---|---|---|---|
| 1,991,054 | 2/1935 | Hampke | 350/306 |
| 2,430,551 | 11/1947 | Arnold et al. | 350/310 |
| 2,464,141 | 3/1949 | Maier | 350/310 |
| 3,552,835 | 1/1971 | Benzies | 350/310 |

Primary Examiner—Alfred E. Smith
Assistant Examiner—Janice A. Howell
Attorney, Agent, or Firm—Charles Hieken

[57] ABSTRACT

A plurality of plane mirrors including a positive reflection subsystem are assembled in a case so as to be substantially free from the distortion and damage caused by changes in ambient temperature. The reflecting apparatus is pivotally mounted on a stand to provide complete information and visual tools for makeup and grooming purposes.

5 Claims, 7 Drawing Figures

REFLECTING APPARATUS

BACKGROUND OF THE INVENTION

The present invention relates to reflecting apparatus and more particularly to a positive reflection subsystem enclosed in a case so as to avoid fracture of the glass and image distortion caused by changes in the ambient temperature.

Reflecting apparatus comprising plane mirrors adapted to present a positive or negative image to a viewer are well known in the prior art. However when the mirrors are enclosed in a case they are subject to fracture or distortion caused by changes in the ambient temperature.

It is an important object of this invention to provide improved methods and apparatus for constructing reflecting systems capable of withstanding extreme changes in ambient temperature without distorting or fracturing.

It is a further object of this invention to achieve the preceding object with a mirror system arranged to reflect a positive image.

It is still a further object of this invention to achieve one or more of the preceding objects with the aid of a case adapted to enclose the mirror system and to be pivotally moved about the center of mass of the reflecting apparatus.

SUMMARY OF THE INVENTION

According to the invention, a reflecting apparatus comprises a case having a grooved lip adapted to receive a glass pane, and first and second co-axial journals extending outwardly from opposite side panels of the case. Flexible tubing is disposed within the grooved lip to press the glass pane against the lip to form a dust seal. A first plane mirror having a predetermined linear coefficient of thermal expansion is attached to an angle brace. A second plane mirror having substantially the same linear coefficient of thermal expansion is attached to the angle brace substantially orthogonal to the first plane mirror to form a system for presenting a positive reflected image. The angle brace has a linear coefficient of thermal expansion within 30% of the predetermined linear coefficient of thermal expansion of the first and second plane mirrors. The system is assembled in the case for viewing and the case is pivotally mounted on a base having journal bearing and clamping means adapted to receive and grip the journals with adjustable tension to enable the reflecting apparatus to be pivotally moved about its approximate center of mass.

Numerous other features, objects and advantages of the invention will become apparent from the following specification when read in connection with the accompanying drawing in which:

DESCRIPTION OF THE PREFERRED EMBODIMENT

Figure 2:
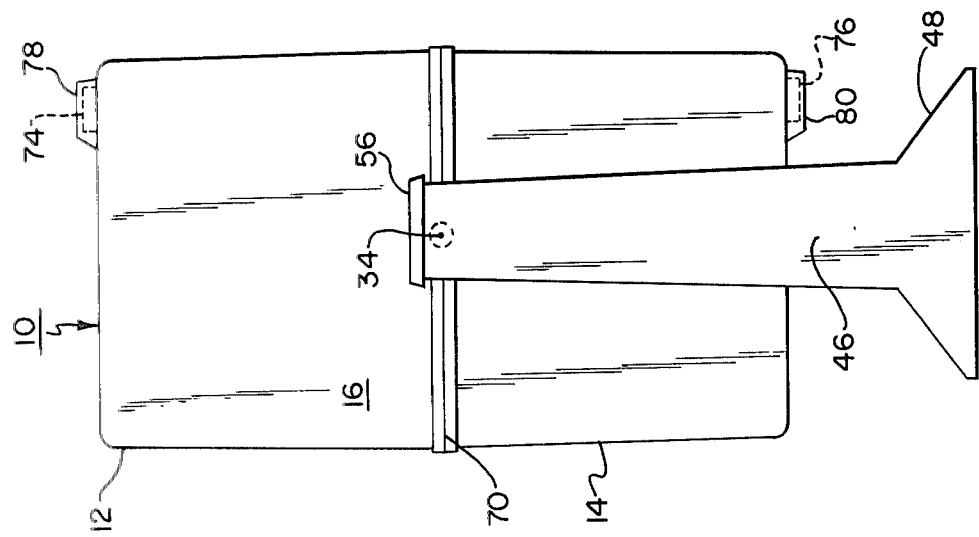
FIG. 2 is a side view of FIG. 1.
Figure 1:
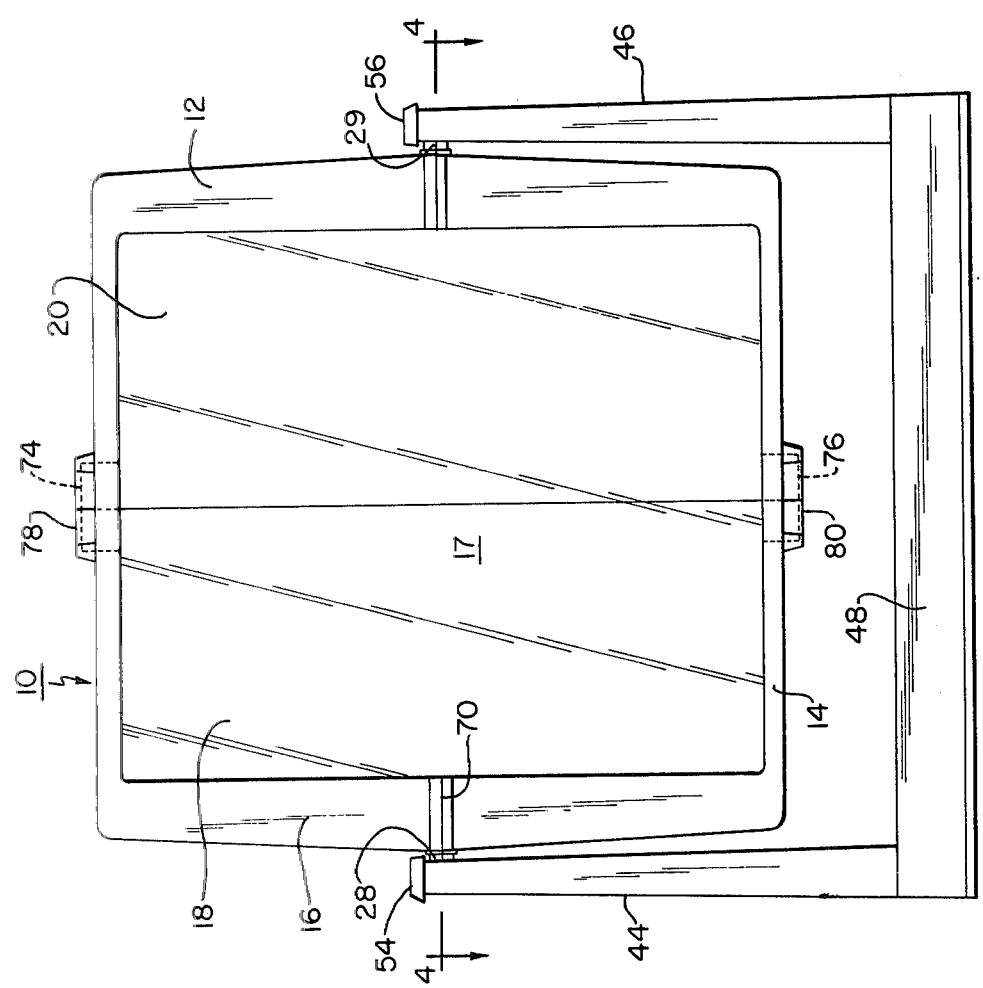
FIG. 1 is a front view of a system of reflecting mirrors arranged according to the invention.
Figure 3:
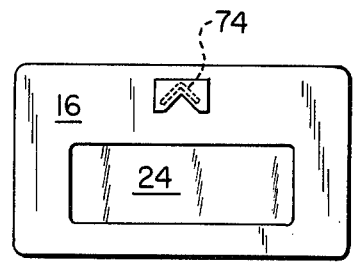
FIG. 3 is a top view of FIG. 1.

Referring to FIGS. 1, 2 and 3, there is shown front, side, and top views of a reflecting apparatus 10 including upper 12 and lower 14 halves of a case 16 assembled to enclose a subassembly 17 of two first surface plane mirrors 18, 20 arranged to reflect a positive image. A third plane mirror 22 is assembled in the back of the case 16 and a magnifying mirror 24 is assembled on the top of the case 16. Thus, the reflecting apparatus 10 includes three reflective devices 17, 22, 24 arranged to provide the user with complete informational and visual tools for makeup and grooming purposes.

Each case half 12, 14 has a half cylindrical journal 26, 27 formed so that the assembled case 16 presents a pair of cylindrical journals 28, 29 projecting outwardly from opposite side panels 30, 32. The journals 28, 29 are coaxial with an axis 34 passing through the center of mass of the apparatus 10. The location of the half cylindrical journals 26, 27 cause a left to right asymmetry between case halves 12, 14 but the assembled case 16 is designed to be rotationally symmetric, such that one mold can be used to produce the case halves 12, 14.

Figure 7:
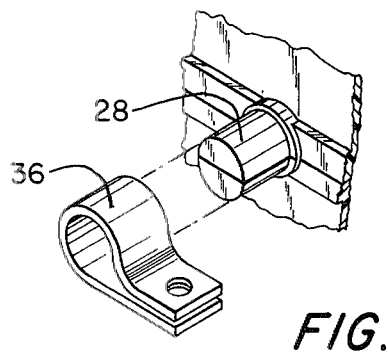
FIG. 7 is a detailed drawing of a journal and clamp.
Figure 4:
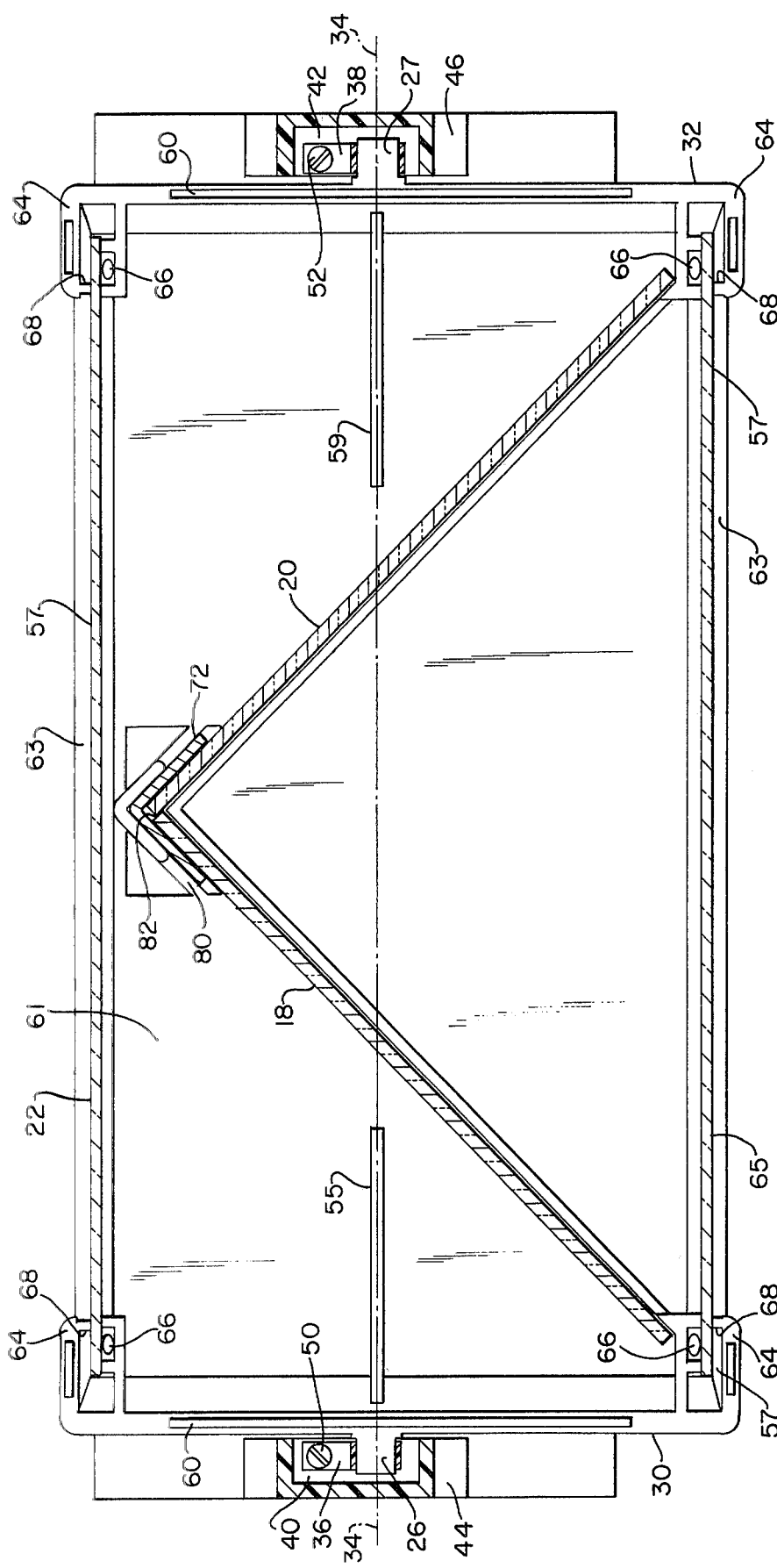
FIG. 4 is a cross sectional view of FIG. 1 taken along line 4—4.

The journals 28, 29 are received in a pair of journal bearing and clamping means 36, 38, such as a cable clamp shown in FIGS. 4 and 7, attached to a recessed portion 40, 42 of substantially parallel arms 44, 46 extending from a base member 48. The cable clamps 36, 38 may be formed from plastic or other material having a low coefficient of friction and are arranged to grip the journals 28, 29 protruding from the case 16 to form a pivot system having a simple tension adjustment for better rotation control. Screws 50, 52 are used to attach the clamps 36, 38 to the arms 44, 46 and to adjust the tension on the journals as the screws 50, 52 are screwed into the arms 44, 46. Caps 54, 56 are assembled on the arms 44, 46 over the recess 40, 42 and clamps 36, 38 after the tension is adjusted.

Figure 5:
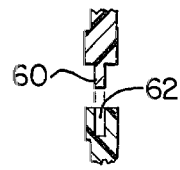
FIG. 5 is a detailed drawing of a tongue and groove used to assemble the case.

Referring to FIG. 4, there is shown a cross-sectional view of the apparatus 10. The lower case half 14 is similar in construction to the upper case half 12 and includes a bottom 61 connected to the first and second opposing side panels 30, 32. Triangular shaped braces 55, 59 are connected to the side panels 30, 32 and bottom 61 to strengthen and reinforce the case half 12, 14 against undesired flexing. A lip 63 having a groove 57 dimensioned to receive the third plane mirror 22 or a section of transparent glass 65 extends along the sides 30, 32 and bottom 61. Tongues 60 extend outwardly from a top edge of the side panels 30, 32. The tongue 60 is intended to fit or be assembled within grooves 62 in the top case half 12 as shown in FIG. 5, whereby the braces 55, 59 and tongue 60 in groove 62 assembly of the halves 12, 14 strengthen and reinforce the assembled case 10 to minimize stress that might otherwise be transferred to the subassembly of mirrors 17.

A dust seal system is provided in the vertical edges 64 of the side panels 30, 32. The dust seal system comprises flexible tubing 66 disposed within the lip 63 to compensate for a taper in the groove 57 in the molded side panels 30, 32. The tapered grooves 57 are used to ease the assembly of the case halves 12, 14 with the mirror subassembly 17 and to allow the part to be successfully ejected from standard plastic injection molding equipment. The tubing 66 forces the glass 65 or mirror 22 against a ridge 68 on the lip 63, thereby keeping dust out of the system 10 without using adhesives to fixedly attach the glass 65 and mirror 22 to the casing 16. In known systems having glass firmly attached to a plastic casing, near freezing temperatures cause the plastic casing to squeeze the glass until it fractures. The only adhesive used in the final assembly of the case 16 present invention is applied along the seam 70 formed on the outside of the case 16 to completely seal the case interior from dust and to weld the halves 12, 14 together.

Figure 6:
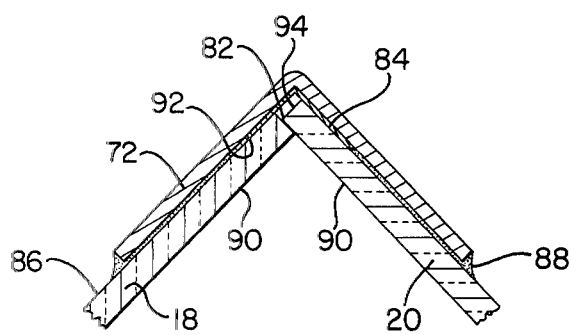
FIG. 6 is a cross-sectional view of an assembled positive reflection subassembly.

The mirror subassembly 17 shown in FIG. 6 comprises the first float glass pane 18 fixedly attached to an angle brace 72 and orthogonal to a second float glass pane 20 also fixedly attached to the angle brace 72. The angle brace formed from a suitable material having substantially the same coefficient of linear thermal expansion as the glass panes 18, 20. For example, a steel angle brace is acceptable. It has been determined that matching the coefficient of linear thermal expansion of the glass 18, 20 to within 30% of the coefficient of linear thermal expansion of the steel angle brace 72 enables the panes 18, 20 to remain substantially orthogonal to each other indefinitely to produce a distortion-free positive image. In addition this technique avoids the consequences of extreme changes in ambient temperature which previously caused fracture of the glass panes, weakening of the adhesive joining them to the angle brace, and changes in the orthogonal relationship between the panes 18, 20. Thus the subassembly 17 avoids some problems ordinarily brought on by extreme temperature changes occurring when the reflecting apparatus 10 is left near a window in the winter, in direct sunlight, or in an unventilated location in the summer, such as in storage or in shipping.

The subassembly 17 is constructed so that the glass panes 18, 20 do not touch the case 16 when enclosed. The ends 74, 76 of the angle brace 72 extend beyond the ends of the glass panes 18, 20. One end 74 of the angle brace 72 is inserted into an angular shaped recess 78 in the bottom of the first case half 12 and an opposite end 76 of the angle brace 72 is received in a similar recess 80 in the bottom of the second case half 14. Thus, the subassembly 17 is completely isolated from the case 16 to prevent thermal expansion and contraction of the case 16 from affecting the precise angle to which the subassembly 17 is tuned. The dust seal for the third plane mirror 22 assembled in in the rear of the case 16 and the glass 65 assembled in front of the subsystem 17 is also temperature stable. Thermal stresses have no significant effect on the tubing 66 used to provide the dust seal in the present invention.

The subassembly 17 shown in FIG. 6 is formed by the following method: placing the first float glass pane 18 orthogonal to the second float glass pane 20 to form a junction 82; placing a thin strip of tape 84 over a rear surface 86 of the junction 82 to prevent liquid adhesive 88 or cement from seeping through the junction 82 and onto a front surface 90 of the glass panes 18, 20; applying a liquid adhesive 88 over an inside surface 92 of the brace 72; pressing the apex 94 of the assembled panes 18, 20 against the adhesive 88 coating the brace 72; and coating the panes 18, 20 with reflective material. This method eliminates handling and cutting problems associated with front surface mirrors.

There has been described novel apparatus and techniques for constructing a reflecting system 10. It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A reflecting apparatus comprising:

a case having a grooved lip adapted to receive a glass pane, and first and second coaxial journals extending ourwardly from opposite side panels of said case along an axis passing through the center of mass of said reflecting apparatus;

flexible tubing disposed within said grooved lip to press said glass pane against said lip to form a dust seal;

an angle brace having a predetermined linear coefficient of thermal expansion;

a first plane mirror having a linear coefficient of thermal expansion within 30% of said predetermined linear coefficient of thermal expansion being attached to said angle brace;

a second plane mirror having a linear coefficient of thermal expansion within 30% of said predetermined linear coefficient of thermal expansion being attached to said angle brace substantially orthogonal to said first plane mirror to form a system for presenting a positive reflective image; said system being assembled in said case for viewing; and a base having journal bearing and clampling means for receiving and gripping said journals with adjustable tension to enable said reflecting apparatus to be pivotally moved about its center of mass.

2. A reflecting apparatus according to claim 1, wherein said angle brace is steel.

3. A reflecting apparatus according to claim 1, wherein said case and tubing are formed from plastic.

4. A reflecting apparatus according to claim 1, further including a third plane mirror assembled in said case for presenting a negative reflective image.

5. A reflecting apparatus according to claim 1, further including a fourth magnifying mirror assembled in said case for presenting a magnified reflective image.

* * * * *